March 10, 1970   J. W. HOLTZ   3,500,072
CIRCUIT FOR GENERATING SHORT-TIME-DURATION PULSES OF
EITHER POSITIVE OR NEGATIVE POLARITY
Filed Nov. 25, 1966   3 Sheets-Sheet 1
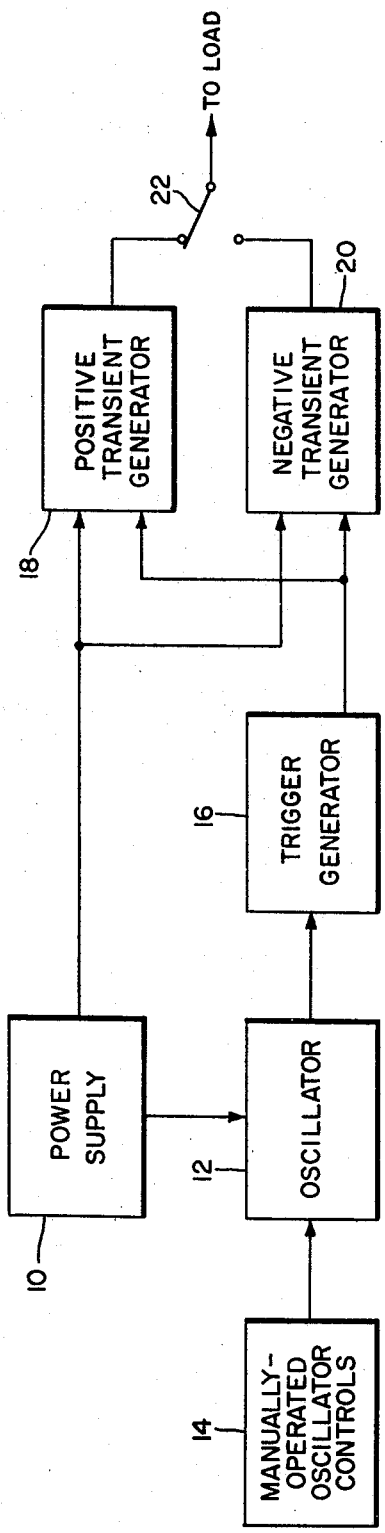
Fig. 1
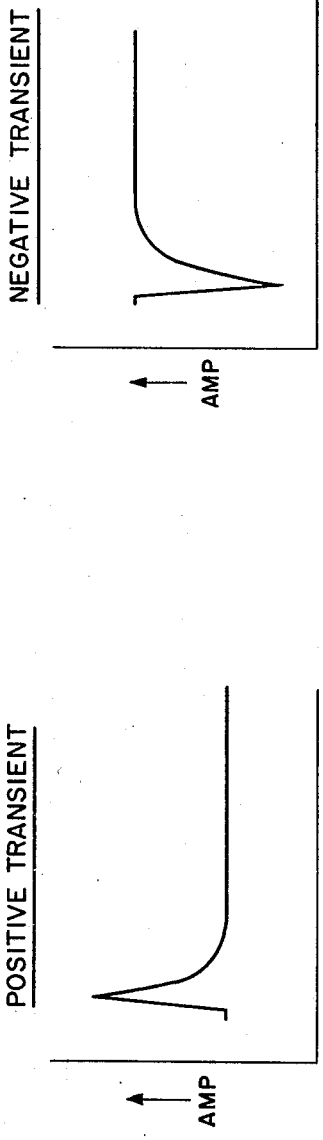
Fig. 5
Fig. 4
INVENTOR.
JAMES W. HOLTZ
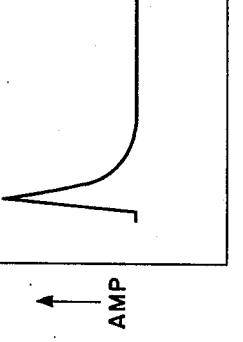
AGENT
ATTORNEY

United States Patent Office 3,500,072
Patented Mar. 10, 1970

---

3,500,072
CIRCUIT FOR GENERATING SHORT-TIME-DURATION PULSES OF EITHER POSITIVE OR NEGATIVE POLARITY
James W. Holtz, San Jose, Calif., assignor, by mesne assignments, to the United States of America as represented by the Secretary of the Navy
Filed Nov. 25, 1966, Ser. No. 597,135
Int. Cl. H03k *1/12*
U.S. Cl. 307—262                                  1 Claim

ABSTRACT OF THE DISCLOSURE

A circuit for producing pulses of either polarity and with a time duration of between one and one-half and two microseconds, the rise time of each pulse being as short as 250 nanoseconds. The circuit employs a trigger generator incorporating a low-power SCR which functions as a switch to "dump" to charge across a resistor to produce a pulse. This pulse is applied to a pair of transient generators which respectively develop positive and negative "spikes" the width of which is controllable as well as the individual rise and fall times.

---

The present invention relates to means for generating electrical pulses of short time duration and of either positive or negative polarity. Although the concept herein described is particularly useful in developing transients for impression on DC power lines, it finds application in any environment where pulses having a width of between one and one-half and two microseconds are required.

While circuit arrangements capable of producing short-time-duration pulses are well known in the art, many of these circuits require relatively high power for successful operation. In addition, a majority of these known arrangements are incapable of generating output pulses of both positive and negative polarity which can be made available selectively for application to a load. Still further, the output impedance of many of these conventional generators is usually so high that some impedence-matching unit is necessary before the pulses can be applied to a desired utilization network. The present invention overcomes this disadvantage by providing an electrical network which is capable of generating transients having a rise time as short as 250 nanoseconds. A standard 60-cycle line input is utilizer, together with a variable oscillator the output of which is fed to a trigger generator incorporating a low-power SCR (silicon-controlled rectifier) which has a large resistor in series with its anode. An associated capacitor is charged when operation of the circuit begins, and this charge is then "dumped" across a resistor to produce a pulse. The latter is coupled through a transformer to increase the voltage thereof, while an R-C network determines the trigger pulse width as well as its rise and fall times. A feature of the present disclosure is the inclusion therein of an internal load having a very small impedance, so that transients can be generated thereacross even though circuit components with relatively low ratings are utilized.

One object of the present invention, therefore, is to provide an electrical circuit designed to generate pulses having a short time duration and of either positive or negative polarity.

A further object of the invention is to provide a pulse-generating network of the type described which has a relatively low internal impedance, thus making possible the use of components having low ratings and of an inexpensive nature.

An additional object of the invention is to provide an electrical network designed to generate either positive or negative transients having a variable repetition rate and with rise and fall times of less than one-half microseconds.

Other objects, advantages, and novel features of the invention will become apparent from the following detailed description of the invention when considered in conjunction with the accompanying drawings wherein:

FIG. 1 is a block diagram of a pulse-generating network designed in accordance with a preferred embodiment of the present invention;

FIGS. 4 and 5 illustrate positive and negative transients, respectively, such as may be developed by the circuit of FIGS. 1 through 3.

Figure 2:
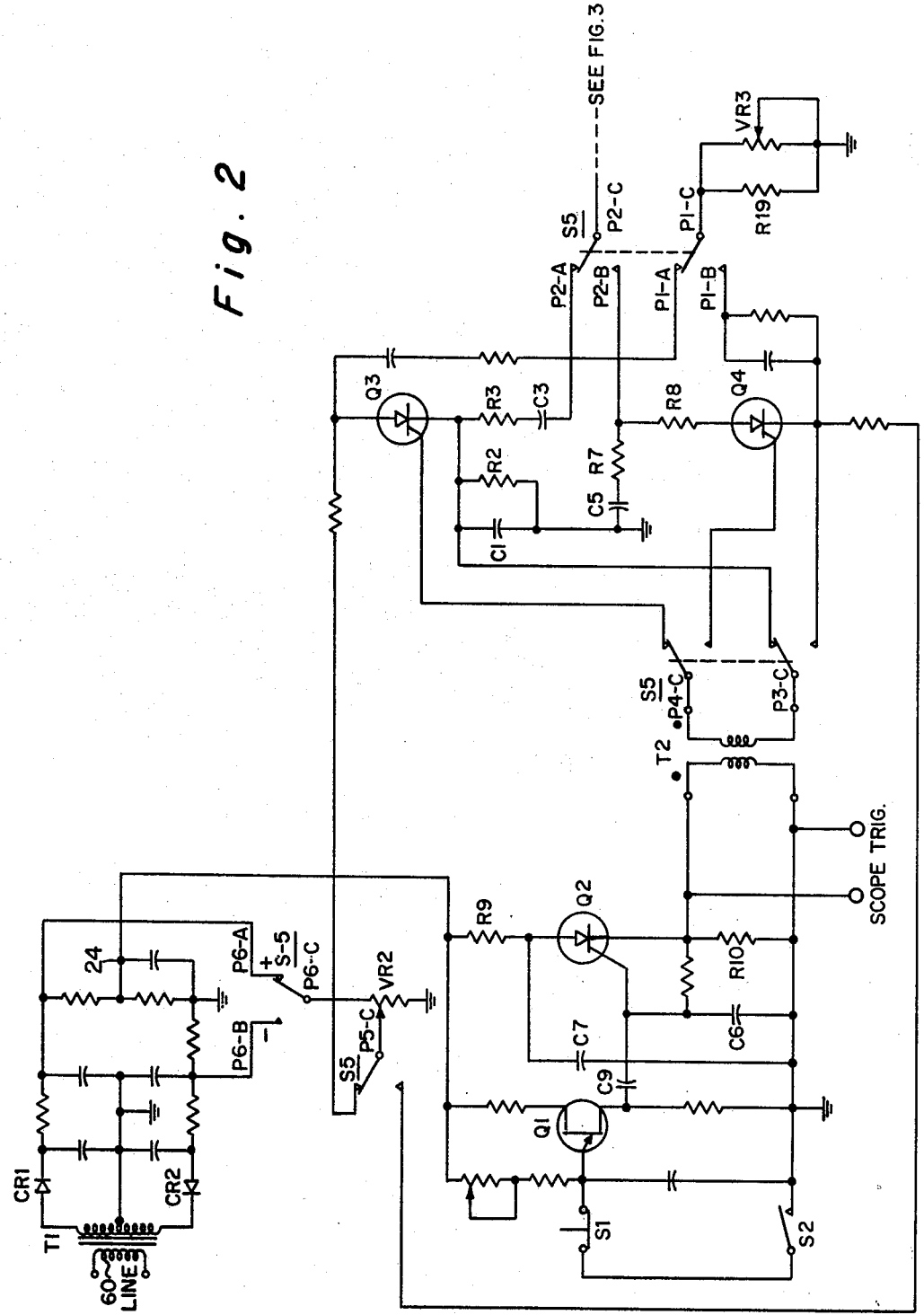
FIG. 2 is a schematic circuit diagram of the pulse-generating network of FIG. 1.

Referring first to FIG. 1 of the drawings, there is shown a pulse-generating network designed in accordance with a preferred embodiment of the present invention. As above stated, this network is particularly suitable for generating either positive or negative transients for impression onto a DC power line in order to measure the susceptibility of such power line to similar transients produced under actual operating conditions. However, the circuit herein described is capable of general utility wherever pulses of short time duration and either positive or negative are desired, and hence the invention will not be described in connection with any particular utilization apparatus.

In FIGURE 1 of the drawings there is shown a power supply generally identified by the reference numeral 10. This power supply is designed to utilize a standard 60-c.p.s. 120-volt input such as might be available from a conventional power line. As will appear later in a description of FIG. 2 of the drawings, the power supply 10 is of a standard half-wave type and supplies an output of +150 volts DC, +30 volts DC, and −150 volts DC. It might be noted that regulation is of no concern due to the transient mode of operation of the apparatus herein described.

The unit 10 supplies power to an oscillator 12 which is of the relaxation type. The operation of oscillator 12 is manually controlled by means 14 which will be described in connection with FIG. 2 of the drawings. The output of oscillator 12 is fed to a trigger generator 16 which develops output pulses for application to a pair of transient generators 18 and 20, respectively. As shown in FIG. 1, the transient generator 18 is designed to produce output pulses of positive polarity, while the transient generator 20 is arranged to develop pulses which extend in a negative direction. The respective outputs of generators 18 and 20 may be selectively coupled through a switch 22 to any desired utilization network.

FIG. 2 of the drawing illustrates a preferred form of circuit designed in accordance with the showing of FIG. 1. As hereinabove stated, the power supply 10 is of the conventional half-wave type utilizing a pair of diodes CR1 and CR2 connected to opposite ends of the secondary winding of the power line transformer T1. Conventional filtering units are effective to establish a steady potential of +30 volts DC at the output terminal 24, while voltages of −150 volts DC and +150 volts DC are respectively available at the contacts P6–B and P6–A of a switch section S–5 the movable contact P6–C of which is connected to ground through a variable resistor VR2 the function of which is to permit an adjustment in the amplitude of the output transients produced by the illustrated network. By varying the resistor VR2, the amplitude of the voltage supplied to the output stages of the circuit of FIG. 2 may be manually selected.

The oscillator 12 of FIG. 1 includes the uni-junction transistor Q1 of FIG. 2. This oscillator is preferably designed to have a variable repetition rate of from 80 pulses per second to 170 pulses per second. The time of operation of the oscillator is controllable through actuation of the switches S1 and S2 which together comprise the unit 14 of FIG. 1. When switch S2 is closed (so that the circuit of FIG. 2 operates in the transient mode) then manual actuation of the push-button switch S1 will permit the oscillator 12 to become operative for as long as the switch S1 is thus held open. When both switches S1 and S2 are closed, the transistor Q1 is rendered non-conductive and no output is produced thereby. If it is desired that the oscillator 12 be free-running, then the switch S2 is opened, and either positive or negative transients are continuously produced by one of the generators 18, 20.

Although the repetition rate of the oscillator 12 has been stated as preferably ranging from 80 pulses per second to 170 pulses per second, modification of the values of the circuit components can raise the repetition rate to as high as 1 megacycle. This can also be done by injection of an external signal, in which case no modification of the disclosed circuitry is required. If such an external signal is utilized, it is applied to the Scope-Trig terminals of a trigger generator 16 which will be subsequently described. However, this external signal should have a pulse width of 1 microsecond or less and an amplitude of at least 5 volts.

The output of the oscillator 12 of FIG. 1 is fed to the trigger generator 16. The coupling between the two units 12 and 16 is by means of the capacitor C9 as illustrated in FIG. 2 of the drawings. The output of the trigger generator 16 is isolated from the following circuitry by means of the transformer T2. The latter is necessary since both positive and negative voltages are present in the output stages 18 and 20. The trigger generator 16 incorporates a low-power silicon-controlled rectifier Q2 which has a large resistor R9 in series with its anode. This resistor R9 is chosen to limit the maximum current to less than the holding current of the SCR. A capacitor C7 is charged up to 30 volts DC when circuit operation is initiated, and at this time the energy stored on the capacitor C7 is "dumped" across the resistor R10 which generates a pulse through the primary winding of transformer T2. This transformer couples the pulse to the movable contacts P4–C and P3–C of switch unit S5, and at the same time increases the voltage of the pulse to approximately 8 volts. The width of the output pulse is governed by the time constant of capacitor C7 and resistor R9, this RC network also governing both the rise and fall times of the output pulse. A further capacitor C6 is utilized as a speed-up device to increase the turn-on time of the silicon-controlled rectifier Q2.

Previous arrangements of the general nature of the circuit herein described have been faced with the problem of transferring a large amount of energy to a very small output load impedance, the latter often having a value of 1 ohm or less. The present invention accomplishes this power transfer with a minimum of components and the employment of but a single pair of low-power semi-conducting elements. For example, the positive transient generator 18 of FIG. 1 utilizes a silicon-controlled rectifier Q3 which may be of the type commonly identified as the type 2N1879. The negative transient generator 20 of FIG. 1 employs a similar rectifier Q4 as shown in FIG. 2, this rectifier Q4 also being of the low-power type such for example as a 2N1879. The output of Q3 is applied through a resistor R3 and capacitor C3 to the stationary contact P2–A of a switch section S5, while the output of rectifier Q4 is coupled through resistor R8 to a further stationary contact P2–B of this same switch section S5. In order to control the decay time of the output transients developed by the generating units 18 and 20 of FIG. 1, the switch S5 is provided with a further unit having a pair of stationary contacts P1–A and P1–B, together with a movable contact P1–C. As illustrated in FIG. 2 of the drawings, the movable contact P1–C is connected to ground through a pair of resistors R19 and VR3 which are connected in parallel relationship. Adjustment of resistor VR3 controls the decay time of the positive transients produced by generator 18 when the movable contact P1–C is in the position illustrated, and similarly controls the decay time of the negative transients developed by generator 20 when the switch contact P1–C is in its lower position as illustrated in the drawings.

Figure 3:
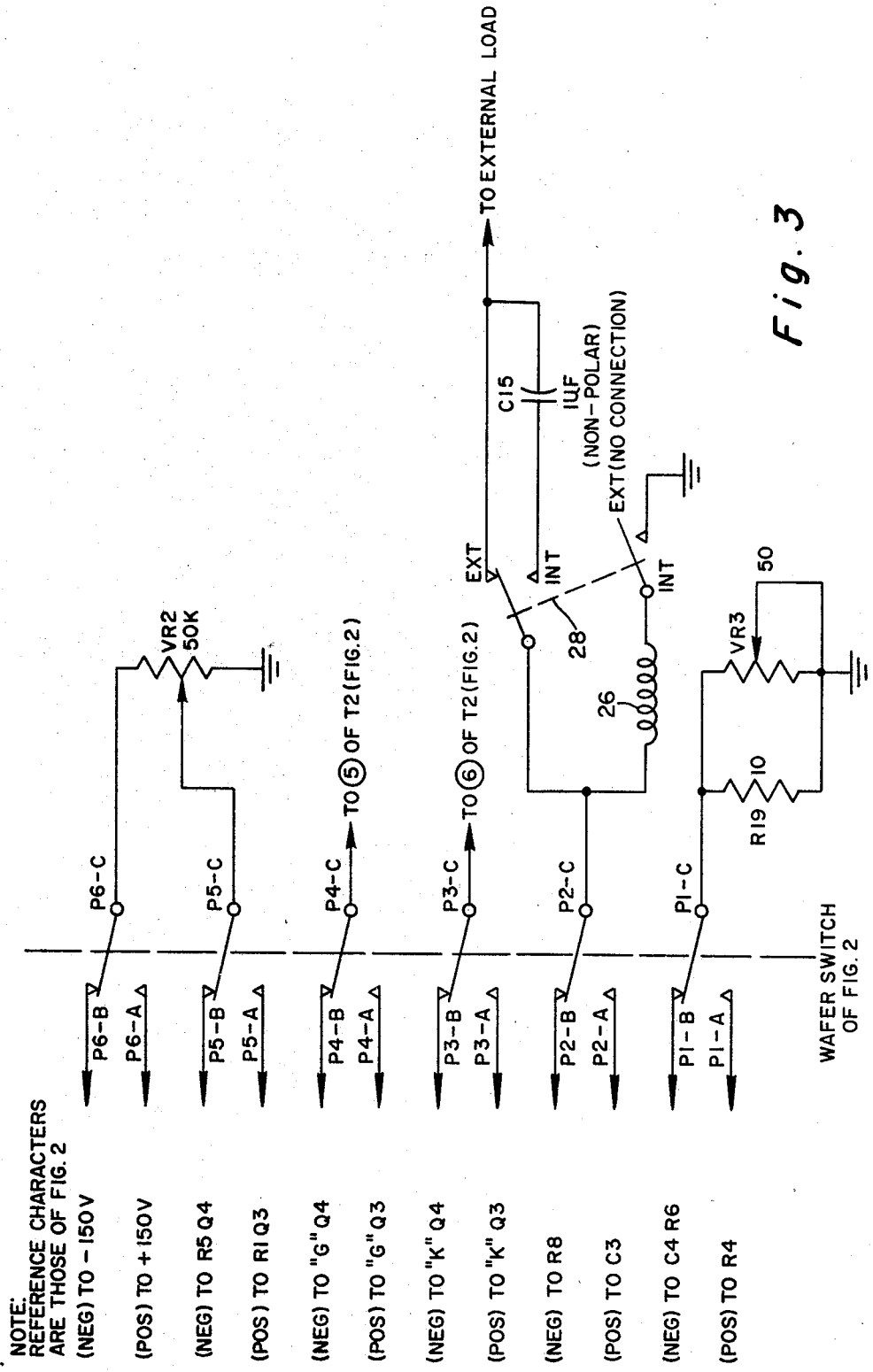
FIG. 3 is a unitary showing of one of the multi-section components of FIG. 2, together with some external circuitry associated therewith.

The various switch sections S5 of FIGURE 2 of the drawing (of which six are illustrated) form part of a "ganged" wafer switch that permits simultaneous actuation of the six movable contacts from one of its "double-throw" positions to the other. This is illustrated in FIG. 3 of the drawings, wherein the interrelationship of the various switch sections is clearly brought out. In addition, the interconnection of the movable contacts P5–C and P6–C through the variable resistor VR2 (as shown in FIG. 2) is shown as well as the manner in which a trigger pulse is developed by the generator 16 and applied through the transformer T2 to either of the transient generators 18 or 20 depending upon whether a positive or a negative output transient is desired. The resistive network R19–VR3 of FIG. 2 is also illustrated in FIG. 3, and the output pulses appearing at the movable contact P2–C are shown as being fed either to an internal load (as represented by the inductor 26) or to an external load (not shown) when the ganged contacts of a switch 28 are in the position designated as "EXT." This internal load schematically represented by the inductor 26 may be designed to simulate the load to which the output pulses are applied when the switch 28 is in the "EXT," or external, position as shown in FIG. 3 of the drawings. It is to be noted that when the switch 28 is in the internal position, the load 26 will shunt any external load placed across the output terminals. However, when the switch 28 is in the external position, the external load forms part of the output circuitry and any malfunctioning of such external load such, for example, as a short circuit, will not damage the circuitry shown in FIG. 2 of the drawings to any extent whatsoever. The internal impedance as represented by the inductor 26 is capacitively decoupled from the external load by a condenser C15. With this capacitor C15 present, the nature of the external load is not critical, and may vary within wide limits. Additional capacitors may be employed in conjunction with C15 if the nature of the particular load requires their use. However, this procedure will be apparent to those skilled in this particular art.

The adjustable resistor VR-2 permits the amplitude of the output pulses to reach a value of approximately 17 volts with the circuit values set forth in FIGURE 2 of the drawings. However, with other repetition rates the pulse amplitude may vary from zero to approximately 25 volts. Furthermore, although it has been stated that the repetition rate is adjustable from 80 pulses per second to about 170 pulses per second, nevertheless it may be raised to as high as 1 megacycle by proper choice of components.

The "speed-up" networks C1–R2 and C5–R7 enable the pulse generator to produce transients with a rise time as short as 250 nanoseconds. By adjusting the pulse-shaping resistor VR3, the decay time of the transient may be adjusted from a minimum width of about 1.5 microseconds to a maximum width of about 2 microseconds.

It may be desirable to view the output of the trigger generator 16 on a monitoring oscilloscope. This is possible by triggering such oscilloscope prior to the arrival of the transient of interest. The latter variation is available as developed across the primary winding of transformer T2, and may be taken off at the terminals designated as "scope trig" in FIG. 2 of the drawings.

In practice, the value of the inductor 26 in FIG. 3 is chosen so as to provide the pulse generator with an inductive reactance of 4 microhenries at 1 kilocycle and a DC resistance of .037 ohm. While the internal load of the generator is not suitable for use when applying the developed pulses to a utilization device such as a power line, nevertheless the output impedance of the network is sufficiently small so that a 10 ohm resistive load causes a 6 db attenuation in the "open circuit" voltage.

FIGS. 4 and 5 of the drawings illustrate representative pulses such as might be obtained when utilizing the circuit of FIGS. 1 through 3. These pulses of FIGURES 4 and 5 were developed on an oscilloscope having a sweep speed of 1 microsecond per centimeter and a vertical sensitivity of 2 volts per centimeter. An external load was utilized during their development. It should be recognized, however, that these pulses of FIGS. 4 and 5 are given purely as an illustration, and that the amplitude and/or width thereof, as well as the decay time, will obviously vary according to the circumstances under which they are produced.

Obviously many modifications and variations of the present invention are possible in the light of the above teachings. It is therefore to be understood that within the scope of the appended claims the invention may be practiced otherwise than as specifically described.

I claim:
1. Apparatus for selectively generating pulses of short time duration and of either positive or negative polarity for application to a low-impedance load, said apparatus comprising:
   an oscillator of the relaxation type having a variable repetition rate;
   a trigger generator receiving the output of said oscillator, said trigger generator developing an output pulse for each cycle of oscillator operation and including a silicon-controlled rectifier, a source of potential, a capacitor charged from said potential source when said rectifier is non-conductive, and a resistor across which the charge on said capacitor is applied upon conduction of said rectifier;
   a pair of transient generators selectively receiving the output of said trigger generator, the output of said trigger generator being selectively connectable to one of said pair of transient generators through a coupling transformer such that one of said transient generators develops output pulses solely of positive polarity and the other of said transient generators develops pulses solely of negative polarity;
   a pulse-shaping network selectively connectable to one of said pair of transient generators as a function of the selective connection thereto of said trigger generator; and
   a load to which the pulse output of each transient generator is selectively applied, said load having an impedance essentially identical to the circuit impedance of the transient generator from which said pulses are received.

References Cited

UNITED STATES PATENTS

| | | | |
|---|---|---|---|
| 3,299,320 | 1/1967 | Kurata | 307—252 X |
| 3,248,634 | 4/1966 | Fudaley et al. | 307—252 X |
| 3,183,372 | 5/1965 | Chin | 307—293 X |
| 3,167,664 | 1/1965 | Stascavage | 307—284 |

OTHER REFERENCES

General Electric, Silicon Controlled Rectifier Manual, 1964, p. 86.

DONALD D. FORRER, Primary Examiner

J. D. FREW, Assistant Examiner

U.S. Cl. X.R.

307—247, 252, 268; 328—57